May 8, 1934.  E. OEHMICHEN  1,958,152
DEVICE FOR AUTOMATICALLY ADJUSTING THE SIZE
OF THE LOOP IN CINEMATOGRAPHIC APPARATUS
Filed Sept. 22, 1930  2 Sheets-Sheet 1
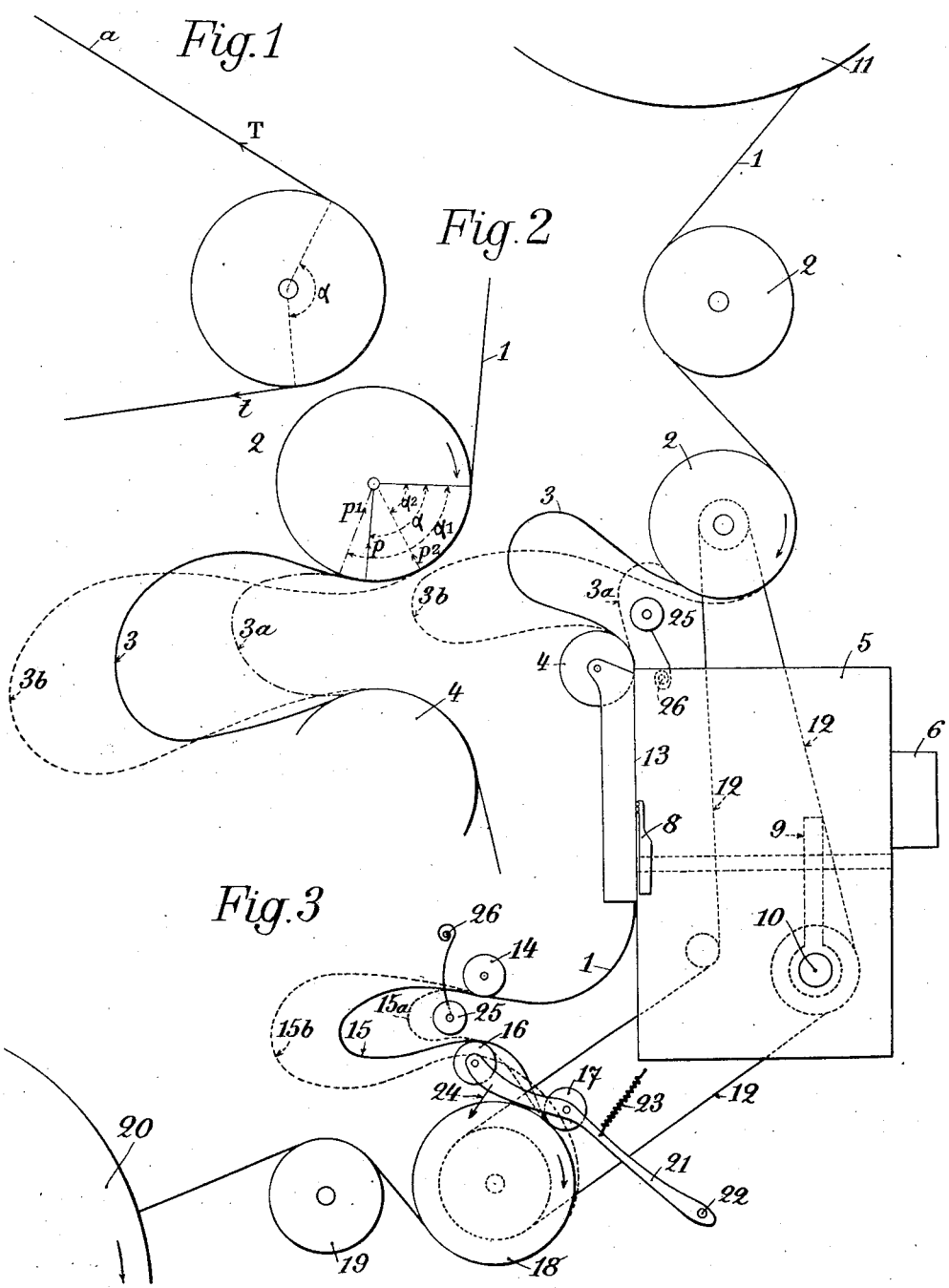
E. Oehmichen
INVENTOR
By Marks & Clerk
ATTYS.

May 8, 1934.                E. OEHMICHEN                 1,958,152
            DEVICE FOR AUTOMATICALLY ADJUSTING THE SIZE
            OF THE LOOP IN CINEMATOGRAPHIC APPARATUS
                       Filed Sept. 22, 1930          2 Sheets-Sheet 2
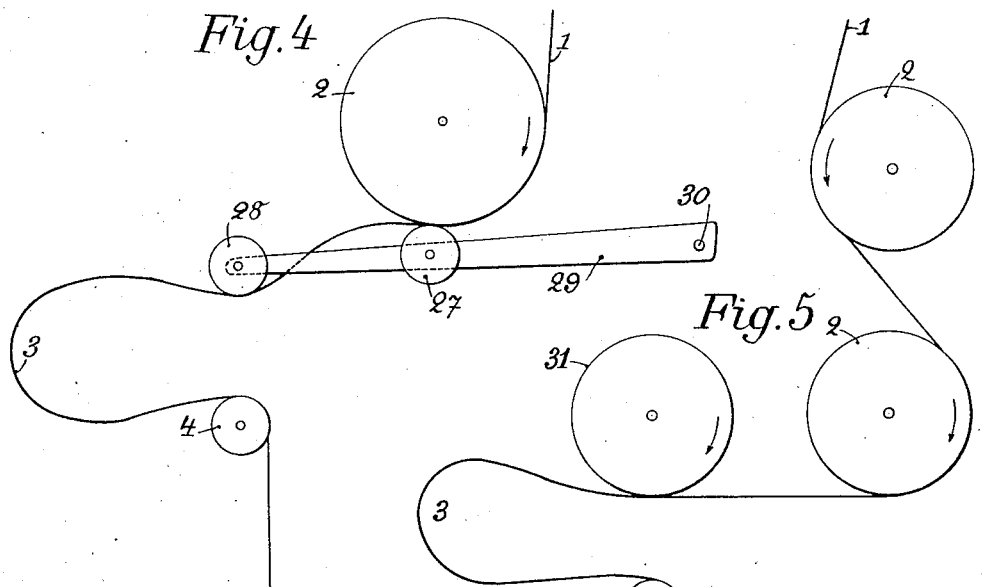
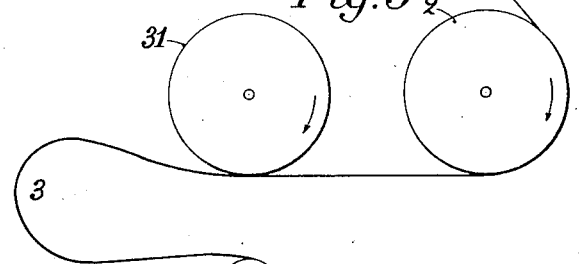
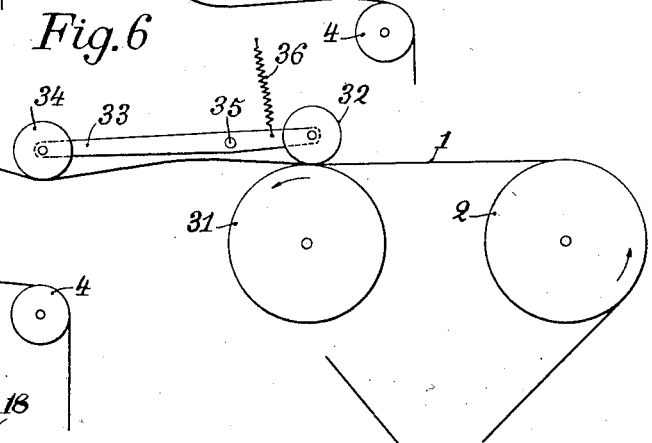
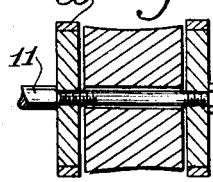
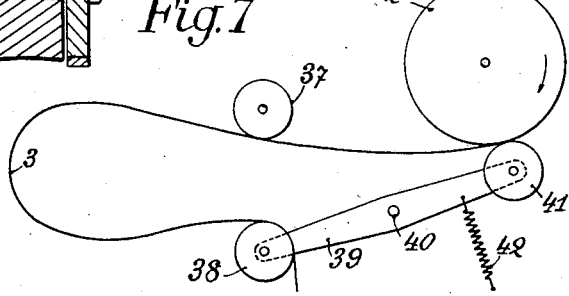
E. Oehmichen
INVENTOR
By: Marks & Clerk
ATTYS Patented May 8, 1934

1,958,152

UNITED STATES PATENT OFFICE 1,958,152

DEVICE FOR AUTOMATICALLY ADJUSTING THE SIZE OF THE LOOP IN CINEMATOGRAPHIC APPARATUS

Etienne Oehmichen, Valentigney, France

Application September 22, 1930, Serial No. 483,643
In France January 27, 1930

2 Claims. (Cl. 88—18)

It is known that in cinematographic projection apparatus, the film must compulsorily, before and after its passage in the intermittent driving mechanism of the film, form a loop of narrowly limited size, for compensating the considerable jerks due to the operation of the intermittent driving members. The deteriorations of the perforations or the bad condition of the film often determine the elimination of this loop, resulting in breakage of the film and stoppage of the projection.

The present invention is adapted to automatically maintain the dimensions of the loop between suitable limits, and moreover ensures a considerable diminution of the wear of the film by avoiding deterioration of the perforations by the teeth of the driving members.

The device forming the subject-matter of this invention is partly based on the principles set forth in the U. S. Patent applications Ser. No. 223,322, filed October 3, 1927, Ser. No. 323,660, filed December 4, 1928, Ser. No. 302,326, filed August 27, 1928, in this sense that use is made of the variations of length of the loop for correlatively modifying the action on the film of the friction members serving to drive or retain it. In the known devices, the top of the loop passes for that purpose on a movable roller and the latter is moved under the influence of the resultant of the longitudinal tensions of the two branches of the loop, tensions which vary according as the loop elongates or shortens under the influence of the variations of unwinding or winding up speed. It is the displacements of the said roller which modify the action of the driving or retarding members.

According to the present invention, the top of the loop is free and use is made of the resilient resistance of the film to flexure by causing the branches of the loop, or at least one of them, to act in a direction perpendicular to their own direction, or on one or more members modifying the driving or braking action.

In fact, the pressures of the branches on these members decrease and can even be annulled when the loop lengths and, on the contrary, increase in proportion as the loop shortens.

This new mode of action of the loop leads to constructional arrangements which are also new and some of which will be described with reference to the accompanying drawings by way of example.

Figs. 1 and 2 are diagrams.

Fig. 3 shows a cinematographic projection apparatus provided with the improvements forming the subject-matter of the present invention.

Figs. 4, 5, 6 and 7 illustrate various forms of construction of the device.

Figure 8 is a sectional view of the friction drum.

The principle of the devices described in the three United States Patent applications previously mentioned, is again seen in Fig. 1 and can be summarized as follows:

The cinematographic film $a$ passes over a friction roller 2, the surface of which is lined with a substance having a high friction coefficient, and arranged for rubbing only on the perforated edges of the film $a$. If we designate by $T$ and $t$ the tension of the said film on the down side and on the up side of the roller 2, and by $\alpha$ the angle according to which the film is in contact with the surface of the roller 2, it will be seen that $T$ and $t$ are connected by the relation:

$$\frac{T}{t} = e^{f\alpha}.$$

In practice, $T$ will be the tension of the film between the friction roller 2 and one or the other of the winding up or unwinding reels; $t$ will be the tension of the band between the roller 2 and the intermittent driving members, or alternatively, between this roller 2 and the supply rollers. This tension can have a relatively small value in order that no deterioration of the perforations can occur on the teeth of the driving members. In fact, it suffices to choose a friction surface so that its friction coefficient relatively to the film be high, and, moreover, to provide a winding up arc $\alpha$ in order that the ratio $$\frac{T}{t}$$

should have a sufficiently high value.

Fig. 2 diagrammatically illustrates the principle of the device in accordance with the invention applied to the unwinding operation. The explanation would be quite similar if the winding up operation was considered. The film coming from the unwinding reel passes over a driving roller 2 having a peripheral speed higher than the average speed of advance of the film; the surface of this roller is lined with a substance having a high friction coefficient and arranged for rubbing only on the perforated edges of the film. When issuing from the roller 2, the film 1 forms a loop 3, then passes over a supporting member 4 and is directed towards the intermittent driving members.

The operation is as follows:—

If, for any reason whatever, the loop 3 diminishes and occupies a position such as $3a$, the stiffness of the film forming this loop develops transverse pressures such as p1 at the point of contact of the film and of the roller 2. These pressures will be so much the more powerful as the dimensions of the loop will be smaller, that is to say as the lack of film will be greater. At the same time and for the same reasons, the winding up arc of the film on the roller 2 tends to increase. The adherence of the film being greater, the latter will be driven by the roller 2 at a speed higher than its average speed and will thus determine an increase of the loop which will occupy successive positions such as 3a, 3, 3b. The expansion stresses of the loop due to the resiliency of the film gradually diminish, resulting in a progressive diminution of the pressure p on the one hand, and of the winding up arc α on the other hand. When the loop occupies the position 3b, the pressure of the film against the roller 2 has a small value such as p2, the winding up a reduced value α2. The adherence of the film against the surface of the driving roller being no longer sufficient, the said film is no longer driven by this roller; as the intermittent driving members constantly exert a pull on the band, the dimensions of the loop will diminish until they become sufficiently small for determining again the adherence of the film on the surface of the driving roller. To sum up, during the operation of the apparatus; the loop will occupy on either side of a mean position, such as 3, corresponding to a pressure p of the film against the surface of the roller 2 and a winding up arc α, positions 3a and 3b which, will automatically determine either the arrival of a further quantity of film, or on the contrary a stoppage in the advance of the film.

In Fig. 3, 5 diagrammatically shows the body of a cinematographic apparatus, in which 6 designates the objective, and 7 the door; the intermittent driving mechanism is represented by claws 8 actuated by means of any transmission 9 driven by a driving shaft 10. The film 1 coming from the unwinding reel 11, passes over a series of friction rollers 2 lined with a substance having a high friction coefficient and adapted to rub only on the perforated edges of the film 1. The rollers 2 are actuated by any transmission 12 driven by the shaft 10, so that the peripheral speed of the said rollers be greater than the mean speed of advance of the film. After its passage on the last friction roller 2, the film forms a loop 3, passes over a loosely mounted roller 4, and enters the gate 13 of the projection apparatus where it is gripped by the clams 8. For facilitating the placing of the film in position, the roller 4 can be conveniently mounted on the door 7. When issuing from the gate, the film passes over a loosely mounted roller 14, forms a loop 15, then passes over of loosely mounted rollers 16—17 and over friction rollers such as 18—19 lined with a substance 50 having a high friction coefficient, adapted to rub only on the perforated edges of the film, and then winds on the winding up reel 20. The friction roller 18 is set in motion by means of any transmission 12 driven by the driving shaft 10, so that its peripheral speed be lower than the mean speed of advance of the film. The roller 19 can be either loosely mounted, or driven in the same way as the roller 18.

If owing to lack of film, the loop 3 formed by the film between the rollers 2 and 4 occupies for instance the position shown at 3a, it determines, owing to the very stiffness of the film a pressure of the latter on the surface of the friction roller 2: The film is therefore driven at a speed higher than its mean speed of advance, and this so much the more as the pressure of the film in the roller is greater. Now, this pressure is in reverse function of the size of the loop; it will be so much the more greater as the loop is smaller, that is to say as the lack of film is great. The loop 3 will therefore rapidly increase, and will pass from the position 3a to the position 3b. In this position, the loop becomes loose and will no longer compel the film to fit against the surface of the last friction roller 2. The contact no longer taking place, the film will no longer be driven, and as it is constantly urged by the driving claws 8, the loop will progressively diminish up to the position 3a, and the operation of the device will begin over again as previously.

A similar construction might be used between the outlet of the gate and the winding up reel. In Fig. 3 has been shown, by way of example, a different construction of the device during the passage of the film from the gate to the winding up reel. The loose rollers 16—17 are mounted on a support 21 capable of rocking about an axis 22 and returned by a spring 23. If it is assumed as previously that a lack of film causes a diminution of the loop occupying at this moment the position 15a, the said loop, owing to the stiffness of the film, will determine a pressure upon the roller 16, resulting in a movement of the support according to the arrow 24, this compelling the roller 17 to press the film against the surface of the friction roller 18. As the peripheral speed of the latter is lower than the mean speed of advance of the film, the loop constantly fed by the intermittent mechanism 8, will increase until it has a dimension 15b, such that the pressure of the latter on the roller 16 will diminish, and that the support 21 will rock under the action of the spring 23. The film being no longer pressed by the roller 17 on the roller 18, will leave the surface of the latter and will be drawn by the winding up reel until the dimensions of the loop determine as previously the contact of the film with the surface of the friction roller 18, and so on.

Whatever may be the device used, the operation will be entirely automatic and the loop as well on the up side as on the down side of the projection gate, will not be able to either increase or diminish in too large proportions without being immediately brought back to a mean value allowing the perfect operation of the cinematographic apparatus.

Within both loops can be conveniently provided a small roller 25 as light as possible, so mounted as to be capable of resiliently rocking about an axis 26 and adapted to stop a too considerable diminution of the loop when any cause whatever, for instance a momentary or permanent diminution of the rigidity of the film or the presence of oil or dust on the friction surfaces, will cause the friction coefficient of the friction rollers to diminish.

Fig. 4 illustrates a form of carrying out the invention similar to the device described for the winding up mechanism in Fig. 3, but applies to the unwinding operation. The film 1 passes over one or more driving rollers such as 2, then over two loose rollers 28 and 4 by forming between the latter a loop 3. The roller 28 is carried by a lever 29 capable of rotating about an axis 30, and carrying a roller 27 serving to press the film against the surface of the roller 2. The operation is identical to that of the device previously described; the diminution of the dimensions of the loop 3 determines, owing to the stiffness of the film, an upward movement of the roller 28, resulting in a pressure of the roller 27 against the film and the friction roller 2, thus driving the film. The weight of the lever 29 and of the rollers 27, 28 can be partially balanced by a spring (not shown).

Figs. 5, 6 and 7 illustrate different forms of carrying out the invention, which forms of construction are applicable as well for the winding up operation as for the unwinding operation. For greater simplicity, the unwinding mechanism alone has been illustrated.

In Fig. 5, the film 1 passing over two friction rollers such as 2 forms a loop between the friction roller 31, having a peripheral speed greater than the mean speed of the film, and the roller 4. The roller 31 is adapted to drive the film 1 as soon as the latter comes in contact with its surface owing to a diminution of the loop 3, and to thus determine on the film an initial tension which, being transmitted to the portion of the film in contact with the friction rollers 2, causes the immediate actuation of the film, resulting in an increase of the loop.

Fig. 6 shows a form of carrying out the invention similar to the device of Fig. 5. The film 1 is pressed on the driving roller 31 by a roller 32 carried by a lever 33 which carries another roller 34 and can rock about an axis 35. A returning spring 36 prevents the roller 32 from bearing on the roller 31 when the dimensions of the loop become exaggerated. The operation is identical to that of the devices previously illustrated.

In Fig. 7, the film after passing over the roller 2 forms a loop between a loose roller 37 and a movable roller 38. The roller 38 is carried by a lever 39 capable of rocking about an axis 40 and carrying a roller 41 which can press the film against the roller 2. A returning spring 42 holds the roller 41 away from the roller 2 when the dimensions of the loop are too great.

In all the forms of construction above described the object of the invention is indeed attained, since the loop, which must be necessarily formed by the film before and after its passage in the intermittent driving members, preserves dimensions maintained within narrow limits, and allows in any case the regular passage of the film without jerks prejudicious to its keeping in good condition.

It would be easy to devise different forms of construction, as it is obvious that the invention is not limited to the examples previously described. In fact, it suffices to provide any mechanical, electric or pneumatic relay set in action by the transverse pressure due to the stiffness of the film when the dimensions of the loop diminish by then causing the film driving members, arranged on this side of the gate, to act, so as to determine the arrival of a further quantity of film, resulting in an increase of the loop up to its mean size, or by acting on the braking members arranged beyond the gate, so as to slow down the winding up of the film and, consequently, to thus produce the increase of the respective loop.

The various means provided in the above mentioned patents can also be applied in combination with the device described above.

I claim:

1. In a cinematographic apparatus the combination of a projection gate, an idle roller at the top of the gate, means for imparting an intermittent movement of advance to the film through the said gate, a device for automatically adjusting the size of a loop below the film gate, said device consisting of a roller over which the film passes after emerging from the loop and which is driven at a constant peripheral speed lower than the mean linear speed of the film, the surface of said roller being partially covered by rings of a material having a high co-efficient of friction which rings serve to support the film upon the roller only by contact with the perforated edges of the film and means operated by the loop for varying the arc of contact between the film and the friction surface of the roller to cause the roller to draw varying lengths of film out of the loop.

2. A device for automatically adjusting the size of a loop below a film gate as described in claim 1 in which the means operated by the loop consists of an articulated spring controlled lever upon which is loosely mounted a pair of rollers, the length of film comprising the lower part of the loop being interlaced between the said rollers.

ETIENNE OEHMICHEN.